(12) United States Patent
Martin et al.

(10) Patent No.: US 12,711,057 B2
(45) Date of Patent: Aug. 18, 2026

(54) SOLVING SUBMISSION QUEUE ENTRY OVERFLOW USING METADATA OR DATA POINTERS

(71) Applicant: Samsung Electronics Co., Ltd., Suwon-si (KR)

(72) Inventors: William Martin, Roseville, CA (US); Daniel Lee Helmick, Thornton, CO (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 18/227,897

(22) Filed: Jul. 28, 2023

(65) Prior Publication Data

US 2024/0168876 A1 May 23, 2024

Related U.S. Application Data

(60) Provisional application No. 63/427,407, filed on Nov. 22, 2022.

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS 8,554,968 B1 10/2013 Onufryk et al.
8,677,068 B2 3/2014 Canepa et al.
9,110,786 B2 8/2015 Carlson et al.
9,304,690 B2 4/2016 McCambridge et al.
9,760,281 B2 9/2017 Ramalingam
10,387,078 B1 8/2019 Benisty
10,466,903 B2 11/2019 Benisty et al.
10,732,897 B2 8/2020 Benisty
10,742,737 B2 8/2020 Choi et al.
10,880,204 B1 12/2020 Shalev et al.
10,884,658 B2 1/2021 Benisty
10,891,061 B2 1/2021 Iwai et al.
(Continued)

FOREIGN PATENT DOCUMENTS

CN 109542335 A 3/2019
CN 112214435 A 1/2021
(Continued)

OTHER PUBLICATIONS

Bhimani, Janki et al., "Fine-Grained Control of Concurrency Within KV-SSDs," Proceedings of the 14th ACM International Conference on Systems and Storage, Jun. 2021, 12 pages.
(Continued)

*Primary Examiner* — Nanci N Wong

(74) *Attorney, Agent, or Firm* — Renaissance IP Law Group LLP

(57) ABSTRACT

A memory is disclosed. The memory may include a first data structure. The first data structure may include a field, which may store a first pointer to a second data structure. The second data structure may include a second pointer to a data relating to a command and a third pointer to a user data. The memory may also include a queue that may include the first data structure.

20 Claims, 11 Drawing Sheets

(56) References Cited

U.S. PATENT DOCUMENTS 11,036,628 B2 6/2021 Hashimoto
11,169,938 B2 11/2021 Gissin et al.
11,294,827 B2 4/2022 Bennett et al.
11,301,163 B2 4/2022 Zhang et al.
11,301,370 B2 4/2022 Pasquale et al.
11,409,469 B2 8/2022 Jo et al.
11,461,052 B1 10/2022 Benisty
11,461,238 B2 10/2022 Jang
11,467,769 B2 10/2022 Benisty
11,570,257 B1* 1/2023 Tanach .................. G06F 9/4806
11,714,767 B1* 8/2023 Goldstein ............... G06F 3/064 710/1
2007/0276789 A1* 11/2007 Keithley ............... G06F 16/258
2011/0060875 A1 3/2011 Haukness et al.
2012/0102275 A1* 4/2012 Resnick ................ G06F 9/3004 708/670
2015/0223691 A1* 8/2015 Choi ...................... G16H 40/67 340/870.07
2015/0248366 A1 9/2015 Bergsten et al.
2016/0027481 A1 1/2016 Hong
2017/0060422 A1 3/2017 Sharifie et al.
2017/0097908 A1* 4/2017 Simionescu ............ G06F 13/28
2017/0116117 A1 4/2017 Rozen et al.
2017/0123721 A1 5/2017 Sela et al.
2017/0123991 A1 5/2017 Sela et al.
2017/0322897 A1 11/2017 Benisty et al.
2018/0113615 A1 4/2018 Park
2018/0335963 A1 11/2018 Simionescu et al.
2019/0035445 A1 1/2019 Huang
2019/0042146 A1* 2/2019 Wysoczanski ........ G06F 3/0659
2019/0243571 A1 8/2019 Narayanan et al.
2019/0278523 A1 9/2019 Benisty
2019/0294366 A1* 9/2019 Kawamura ............. G06F 3/061
2020/0004445 A1 1/2020 Benisty
2020/0151134 A1 5/2020 Helmick et al.
2020/0174819 A1 6/2020 Dong et al.
2020/0409601 A1 12/2020 Helmick et al.
2021/0026780 A1* 1/2021 Ahmed ................... G06F 3/065
2021/0103445 A1* 4/2021 Schauer ................ G06F 9/3004
2021/0182219 A1 6/2021 Benisty
2021/0208810 A1* 7/2021 Manohar ............... G06F 3/0653
2021/0247935 A1 8/2021 Beygi et al.
2022/0027292 A1 1/2022 Gissin et al.
2022/0035530 A1 2/2022 Vikram Singh
2022/0035564 A1 2/2022 Vikram Singh et al.
2022/0043570 A1 2/2022 Richter et al.
2022/0083269 A1 3/2022 Sano et al.
2022/0147276 A1 5/2022 Watanabe
2022/0156001 A1 5/2022 Anandan et al.
2022/0171572 A1 6/2022 Gyllenskog
2022/0197704 A1 6/2022 Gibb et al.
2022/0261183 A1 8/2022 Horspool et al.
2022/0311716 A1 9/2022 Dutta
2022/0357887 A1 11/2022 Wu et al.
2023/0004329 A1 1/2023 Benisty
2023/0079432 A1* 3/2023 Kawaguchi ........... G06F 3/0611 726/22
2023/0297246 A1* 9/2023 Nagai ................... G06F 3/0656 711/154
2023/0333775 A1 10/2023 Jain et al.
2023/0376422 A1* 11/2023 Watanabe ............. G06F 3/0659
2024/0354021 A1* 10/2024 Xu ............................ G06F 3/06

FOREIGN PATENT DOCUMENTS

DE 102020108303 A1 12/2020
EP 3945407 A1 2/2022
WO 2022143774 A1 7/2022

OTHER PUBLICATIONS

Borello, Gabriele, “Towards Computational Storage,” Master’s Degree Thesis, Politecnico Di Torino, Oct. 2021, 101 pages.
Marks, Kevin, “An NVM Express Tutorial,” Flash Memory Summit, 2013, 92 pages.
Office Action for U.S. Appl. No. 18/227,902, mailed Sep. 6, 2024.
Final Office Action for U.S. Appl. No. 18/227,902, mailed Apr. 18, 2025.
NVM Express, “NVM Express Base Specification Revision 1.4,” Jun. 2019, 64 pages.
Office Action for U.S. Appl. No. 18/227,899, mailed Mar. 3, 2025.
Corrected Notice of Allowability for U.S. Appl. No. 18/227,899, mailed Nov. 10, 2025.
Corrected Notice of Allowability for U.S. Appl. No. 18/227,902, mailed Nov. 19, 2025.
Notice of Allowance for U.S. Appl. No. 18/227,899, mailed Oct. 8, 2025.
Notice of Allowance for U.S. Appl. No. 18/227,902, mailed Aug. 4, 2025.

* cited by examiner

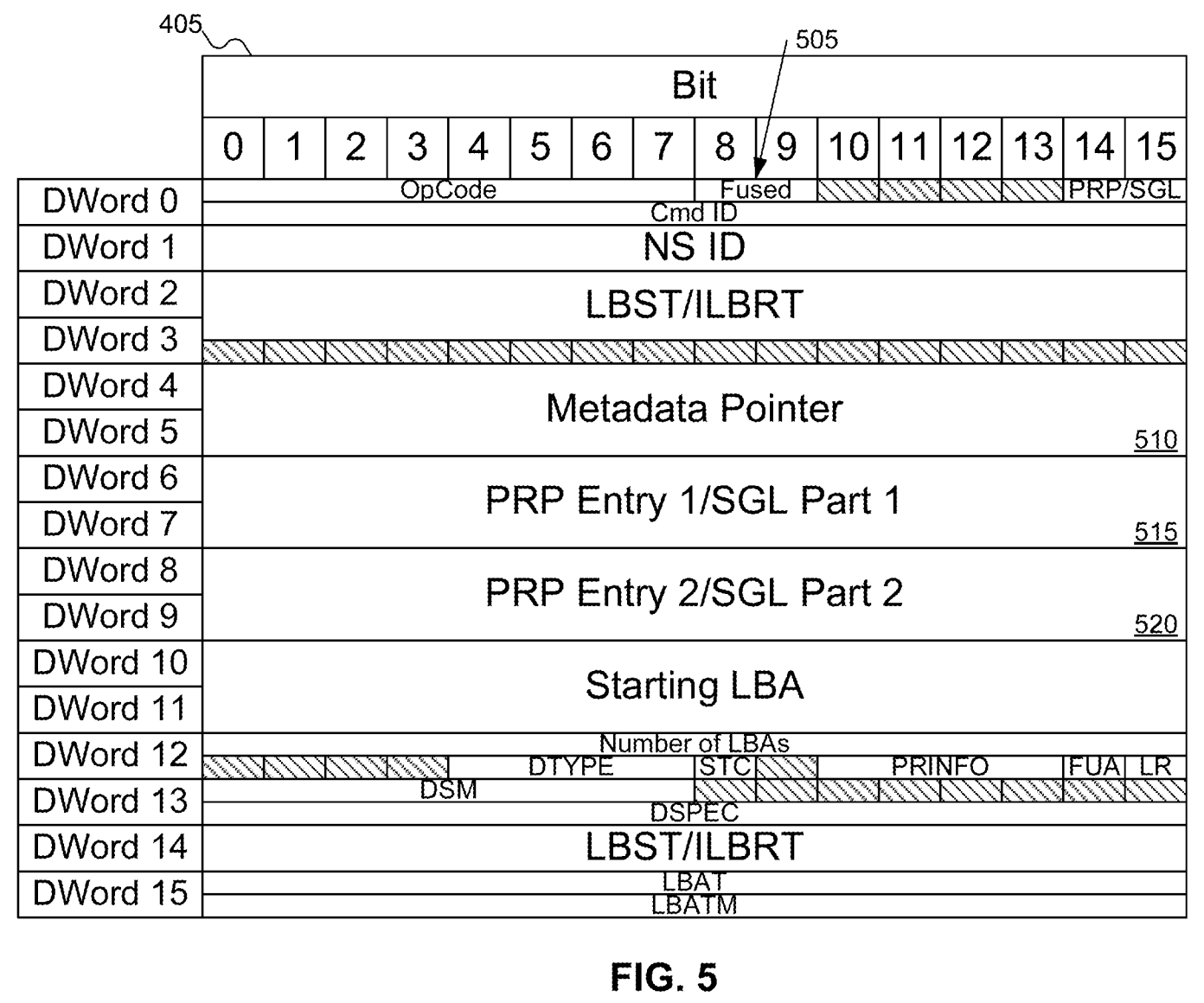

405

505

| | Bit |
|---|---|
| | 0 1 2 3 4 5 6 7 8 9 10 11 12 13 14 15 |
| DWord 0 | OpCode (bits 0–7); Fused (bits 8–9); PRP/SGL (bits 14–15) |
| | Cmd ID |
| DWord 1 | NS ID |
| DWord 2 | LBST/ILBRT |
| DWord 3 | |
| DWord 4 | Metadata Pointer 510 |
| DWord 5 | |
| DWord 6 | PRP Entry 1/SGL Part 1 515 |
| DWord 7 | |
| DWord 8 | PRP Entry 2/SGL Part 2 520 |
| DWord 9 | |
| DWord 10 | Starting LBA |
| DWord 11 | |
| DWord 12 | Number of LBAs |
| | DTYPE (bits 4–7); STC (bit 8); PRINFO (bits 10–13); FUA (bit 14); LR (bit 15) |
| DWord 13 | DSM (bits 0–7) |
| | DSPEC |
| DWord 14 | LBST/ILBRT |
| DWord 15 | LBAT |
| | LBATM |

FIG. 5

SOLVING SUBMISSION QUEUE ENTRY OVERFLOW USING METADATA OR DATA POINTERS

RELATED APPLICATION DATA

This application is related to U.S. patent application Ser. No. 18/227,899, filed Jul. 28, 2023, claims the benefit of U.S. Patent Application Ser. No. 63/427,415, filed Nov. 22, 2022, and U.S. Provisional Patent Application Ser. No. 63/427,410, filed Nov. 22, 2022, all of which are incorporated by reference herein for all purposes.

This application is related to U.S. patent application Ser. No. 18/227,902, filed Jul. 28, 2023, which claims the benefit of U.S. Provisional Patent Application Ser. No. 63/453,754, filed Mar. 21, 2023, U.S. Provisional Patent Application Ser. No. 63/427,422, filed Nov. 22, 2022, and U.S. Provisional Patent Application Ser. No. 63/427,420, filed Nov. 22, 2022, all of which are incorporated by reference herein for all purposes.

FIELD

The disclosure relates generally to storage devices, and more particularly to increasing the amount of data that may be included with a submission queue entry.

BACKGROUND

Hosts submit commands to storage devices using submission queues. A typical submission queue entry includes 64 bytes of data. Fields in the submission queue entries include, for example, an identifier for the command and the logical block address of the data, among other possibilities. But as the amount of data included in a submission queue entry, particularly information that is included in a standard, has grown, the space available for additional information that might be provided by the host has shrunk. Soon, almost every bit in a submission queue entry may be used, leaving no room for additional data that a host might want to include in a submission queue entry.

A need remains to support including additional data in a submission queue entry.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 5 shows details of the submission queue entry of FIG. 4 for a write command to be submitted to the storage device of FIG. 1, according to embodiments of the disclosure.

SUMMARY

Figure 1:
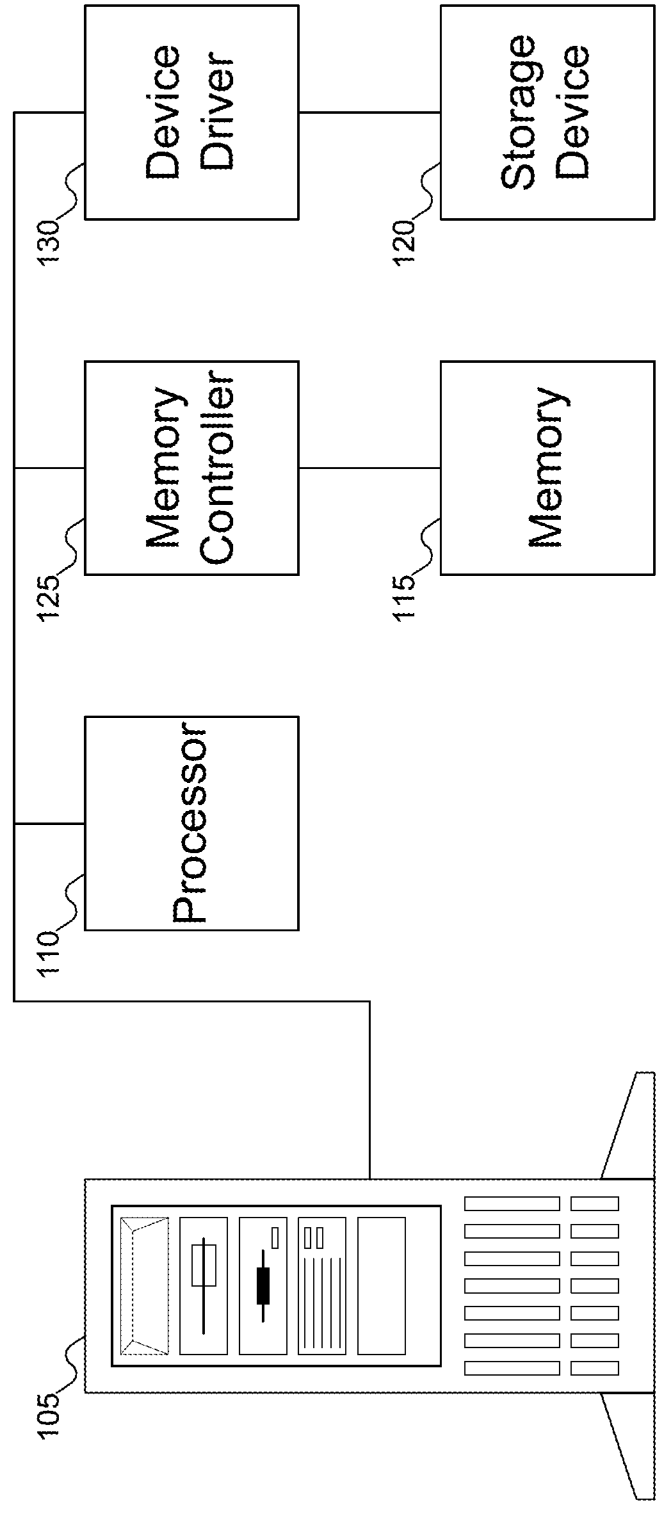
FIG. 1 shows a machine including a processor and storage device to support submission queue entries for commands sent to the storage device, according to embodiments of the disclosure.

Embodiments of the disclosure include a processor. The processor may establish data structures for a submission queue entry and a memory page containing additional data relating to the command, which may be provided to the storage device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Submission queues provide a mechanism by which a host may send a command to a storage device. A submission queue is typically implemented as a circular buffer, often stored in the host memory, with entries of a fixed size, typically 64 bytes. When the host wants to issue a new command to the storage device, the host may place one or more entries in a submission queue. The host may then "ring the doorbell" by writing a new value in a submission queue tail pointer in the storage controller. The new value may point to the most recent entry added to the submission queue. The storage controller may be alerted to the new submission queue entry by the update to the submission queue tail pointer, and may then read the submission queue entry from the submission queue. The storage controller may also update a submission queue head pointer, to reflect that a submission queue entry has been removed from the submission queue. The submission queue head and tail pointers may be thought of as pointers to the oldest and newest entries in the submission queue, so that the submission queue may operate as a first in, first out (FIFO) queue (although the storage device may take entries from the submission queue in any desired order).

Initially, the submission queue entry included relatively few fields of data, leaving much of the submission queue entry reserved for future purposes. Because fields were not used, manufacturers could use those reserved fields for their own purposes. As standards have evolved, more of the data in the submission queue entry has been assigned specific purposes, which may make those fields unavailable for other purposes.

Some embodiments of the disclosure address this problem by storing additional data relating to the command in a metadata structure. For example, storage device commands may use a Physical Region Page (PRP) or Scatter Gather List (SGL) to store relevant data: these structures may be augmented to support other data relating to the command. The PRP or SGL may be modified to support identifying memory areas that are used for additional data relating to the command. The memory area used for the additional data relating to the command may also include header information, such as the size of the stored therein, the format of the data, or a version of the structure used to store the data. The host may query the storage device for supported sizes, formats, etc.

FIG. 1 shows a machine including a processor and storage device to support submission queue entries for commands sent to the storage device, according to embodiments of the disclosure. In FIG. 1, machine 105, which may also be termed a host or a system, may include processor 110, memory 115, and storage device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Storage device 120 may be used to store data that may be termed "long-term": that is, data that is expected to be stored for longer periods of time, or that does not need to be stored in memory 115. Storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives (HDDs) and Solid State Drives (SSDs). Any reference to "SSD" below should be understood to include other embodiments of the disclosure, such as HDDs or other storage device forms.

Embodiments of the disclosure may include any desired mechanism to communicate with storage device 120. For example, storage device 120 may connect to one or more busses, such as a Peripheral Component Interconnect Express (PCIe) bus, or storage device 120 may include Ethernet interfaces or some other network interface. Other potential interfaces and/or protocols to storage device 120 may include NVMe, NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and Compute Express Link® (CXL®), among other possibilities. (Compute Express Link and CXL are registered trademarks of the Compute Express Link Consortium, Inc. in the United States.)

Figure 2:
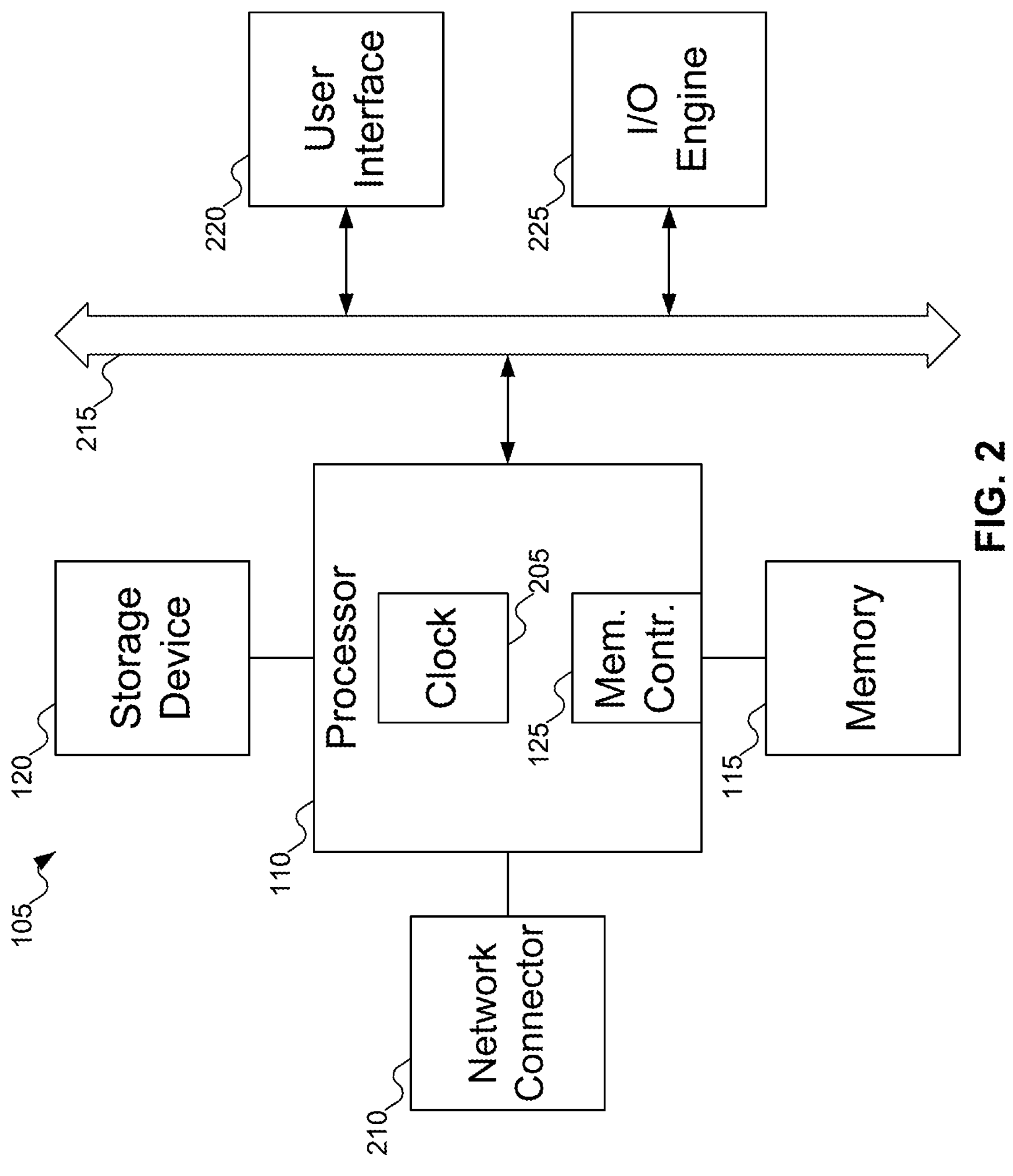
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
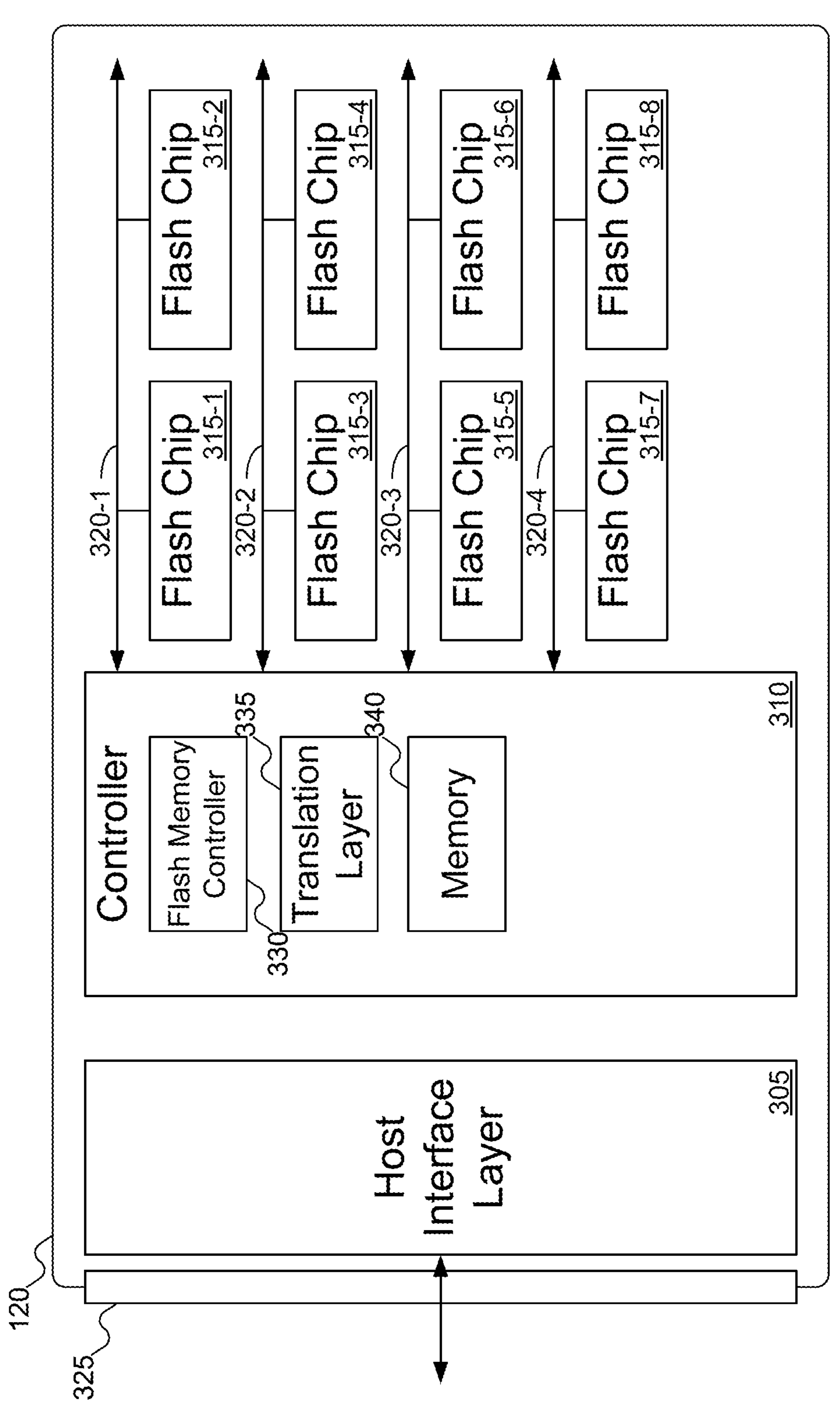
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage"), which may be organized into various channels 320-1 through 320-4. Host interface layer 305 may manage communications between storage device 120 and other components (such as processor 110 of FIG. 1). Such communication may be through, for example, a connector, such as connector 325. Host interface layer 305 may also manage communications with other devices aside from processor 110 of FIG. 1: for example, other storage devices (either local to or remote from machine 105 of FIG. 1) or remote processors. Communications with remote device may be handled, for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315-1 through 315-8 using flash memory controller 330. SSD controller 310 may also include flash translation layer 335, which may manage the mapping of logical block addresses (LBAs) (as used by processor 110 of FIG. 1) to physical block addresses (PBAs) where the data is actually stored on storage device 120. By using flash translation layer 335, processor 110 of FIG. 1 does not need to be informed when data is moved from one block to another within storage device 120. Controller 310 may also include memory 340, which controller 310 may use for local processing. For example, controller 310 may use memory 340 as a buffer for data being received from or sent to processor 110 of FIG. 1.

While FIG. 3 shows storage device 120 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits.

Figure 4:
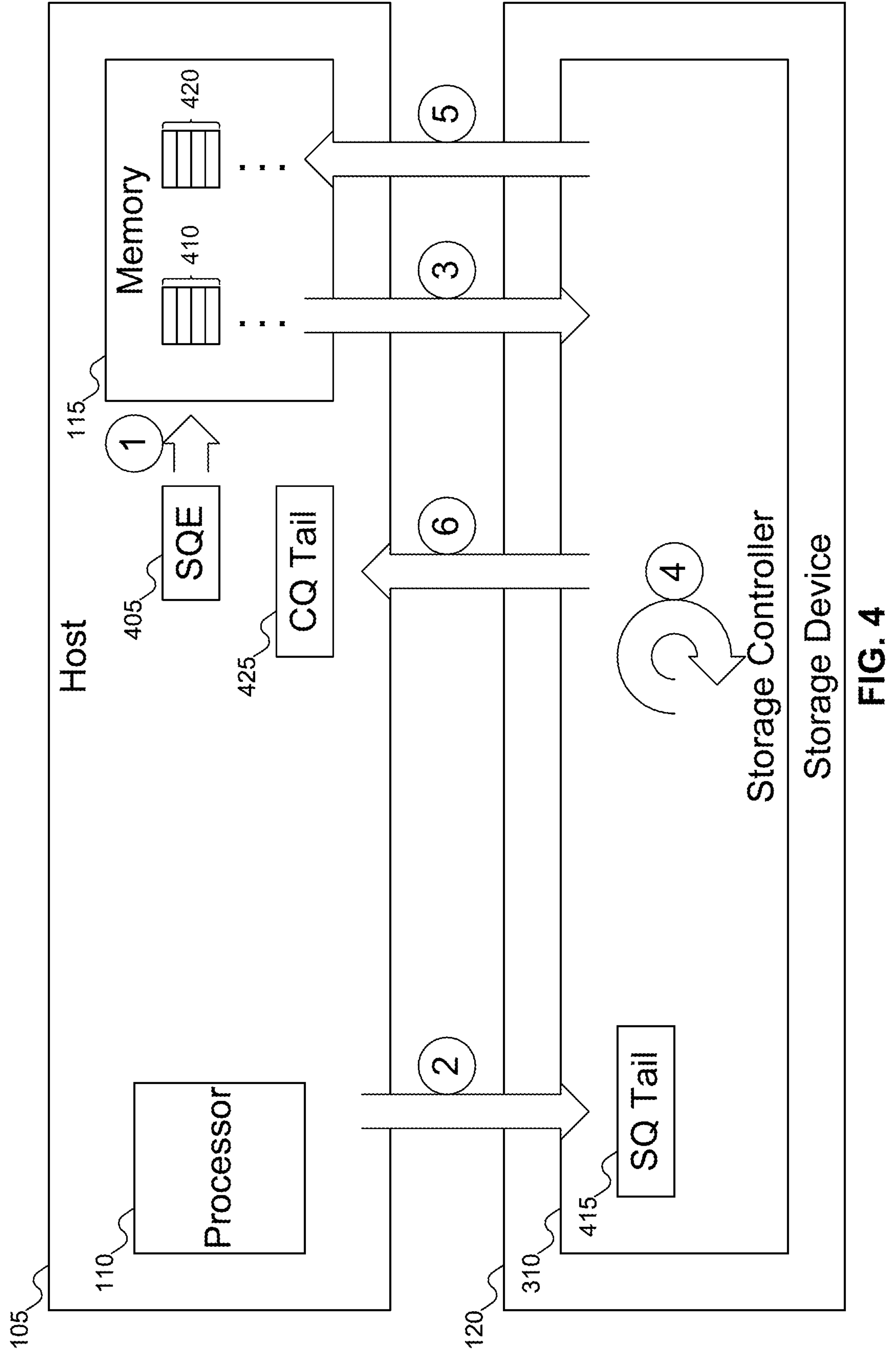
FIG. 4 shows the process of submitting a command to the storage device of FIG. 1 using a submission queue entry, according to embodiments of the disclosure.

FIG. 4 shows the process of submitting a command to storage device 120 of FIG. 1 using a submission queue entry, according to embodiments of the disclosure. In FIG. 4, host 105 (more specifically, processor 110 of FIG. 1) may establish submission queue entry (SQE) 405 (SQE 405 may also be referred to as data structure 405). SQE 405 may contain information about the particular request or command processor 110 is sending to storage device 120.

FIG. 5 shows details of SQE 405 of FIG. 4 for a write command to be submitted to storage device 120 of FIG. 1, according to embodiments of the disclosure. Different commands may structure SQEs differently, but embodiments of the disclosure are applicable to any SQE, regardless of how structured or what command is specified in the SQE.

SQE 405 may be organized into various double words (DWords), and may include various fields. For example, SQE 405 may include fields such as Fused 505, metadata pointer 510, Physical Region Page (PRP) Entry 1/Scatter Gather List (SGL) Part 1 515, and/or PRP Entry 2/SGL Part 2 520. SQE 405 may also include various other fields as shown, such as an operation code (opcode), a command identifier (CMD ID), namespace identifier (NS ID). Table 1 below shows the meanings of the various acronyms used in FIG. 5.

TABLE 1

| Table of Acronyms | |
|---|---|
| PRP | Physical Region Page |
| STC | Self-test Code |
| SGL | Scatter Gather List |
| FUA | Force Unit Access |
| LBST | Logical Block Storage Tag |
| DSM | Dataset Management |
| ILBRT | Initial Logical Block Reference Tag |
| DSPEC | Directive Specific |
| LBA | Logical Block Address |
| LBAT | Logical Block Application Tag |
| LBATM | Logical Block Application Tag Mask |
| LR | Limited Retry |
| opcode | Operation Code |
| CMD ID | Command Identifier |
| NS ID | Namespace Identifier |
| DTYPE | Directive Type |
| PRINFO | Protection Information Field |

Returning to FIG. 4, after SQE 405 has been established, processor 110 may add SQE 405 to submission queue 410. The addition of SQE 405 to submission queue 410 is shown in FIG. 4 as operation 1 (represented as a circle with the number 1 inside it). Processor 110 may then update submission queue tail pointer 415 in storage controller 310 of storage device 120, shown as operation 2. By updating submission queue tail pointer 415, processor 110 may inform storage device 120 that SQE 405 has been added to submission queue 410: submission queue tail pointer 415 may function as a doorbell being rung by processor 110. Note that other techniques may also be used to notify storage device 120 that SQE 405 has been added to submission queue 410. For example, submission queue tail pointer 415 might be stored in memory 115 of host 105, with another register in storage controller 310 being used as a doorbell: storage controller 310 might then read the value from submission queue tail pointer 415. Or, processor 110 might use an interrupt to inform storage device 120 to the new entry in submission queue 410.

Regardless of how processor 110 might notify storage device 120 that SQE 405 is in submission queue 410, once storage device 120 is aware, storage device 120 may read SQE 405 from submission queue 410, shown as operation 3. Storage device 120 may then execute the command specified by SQE 405, shown as operation 4.

Once storage device 120 has completed execution of the command, storage device 120 may add an entry to completion queue 420, shown as operation 5. Finally, storage device 120 may update completion queue tail pointer 425 to let processor 110 know that there is a new entry in completion queue 420. As with operation 2, operation 6 may be performed in other manners. For example, completion queue tail pointer 425 might be stored in storage device 120, and some register in processor 110 might act as a doorbell to alert processor 110 to the new entry in completion queue 420, or storage device 120 might use an interrupt to inform processor 110 to the new entry in completion queue 420. Head and tail doorbells may also be referred to as head and tail pointers.

Various other operations, not shown in FIG. 4, may also be part of the processing of SQE 405. For example, submission queue 410 and completion queue 420 may have head pointers, which may be used in removing entries from the queues: these head pointers are not shown in FIG. 4. Nor does FIG. 4 show what processor 110 might do after removing the entry from completion queue 420.

While FIG. 4 suggests that submission queue tail pointer 415 is stored in storage controller 310 and completion queue tail pointer 425 is stored in host 115, embodiments of the disclosure may place these elements (along with the corresponding queue head pointers) anywhere desired. For example, all four pointers might be in storage controller 310, or all four pointers might be in processor 110, or the four pointers may be distributed in any desired manner between processor 110 and storage controller 310.

While FIG. 4 shows one submission queue 410 and one completion queue 420, in some embodiments of the disclosure there may be more than one submission queue 410 and/or more than one completion queue 420 for use with storage device 120. For example, in some embodiments of the disclosure, the NVMe specification may support up to 65,536 submission queues 410 and 65,536 completion queues 420 (one submission queue and one completion queue may be used for administrative purposes, with the remaining queues used for input/output (I/O) purposes). The number of submission queues 410 and/or completion queues 420 may depend on the system configuration and/or performance requirements.

In addition, the size of submission queues 410 and/or completion queues 420 may vary. Administrative queues may include up to 4096 entries, whereas I/O queues may include up to 65,536 entries. Thus, at one extreme, there may be a total of 4,294,905,856 SQEs (65,536 SQEs in each of 65,535 I/O queues, plus 4096 SQEs in an administrative queue). Like the number of submission queues 410 and/or completion queues 420, the depth of the various queues may also be configured for the system.

Figure 6:
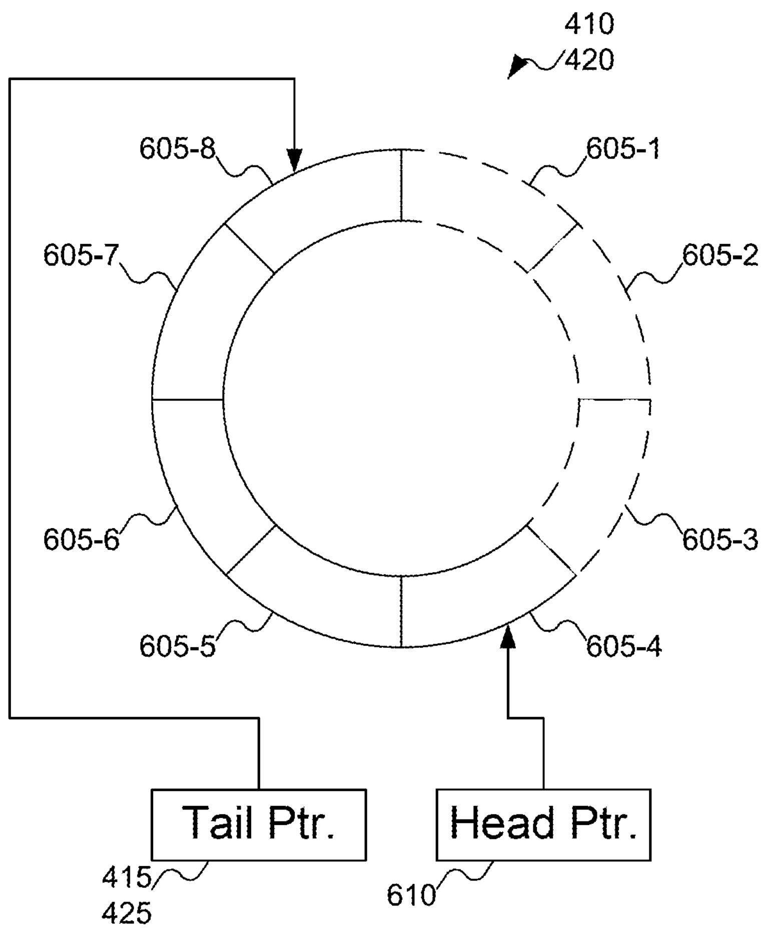
FIG. 6 shows a high-level representation of the submission queue of FIG. 4, according to embodiments of the disclosure.

FIG. 6 shows a high-level representation of submission queue 410 of FIG. 4, according to embodiments of the disclosure. In FIG. 6, submission queue 410 (and completion queue 420 as well) are shown as circular arrays. As implemented, submission queue 410 might not be "circular" per se, but may be stored in a block of memory that may have a lower address and an upper address: when an SQE has been added at the end of the block of memory, the next SQE may be added at the other end of the block of memory, thus achieving a "circular" implementation. Additionally, while submission queue 410 and/or completion queue 420 is shown in FIG. 6 as using a contiguous memory space, other embodiments of the disclosure may implement submission queue 410 (and/or completion queue 420) using noncontiguous blocks of memory, with the memory blocks being iterated in a sequential order before starting again at the beginning.

As shown in FIG. 6, submission queue 410 includes eight entries 605-1 through 605-8 (which may be referred to collectively as entries 605). Tail pointer 415 (for submission queue 410; for completion queue 420, tail pointer 425 may be used) may point to the most recently added entry, whereas head pointer 610 may point to the oldest entry (and therefore the entry to be removed first). Thus, as shown in FIG. 6, queue 410/420 currently includes (in order of entry into queues 410/420) entries 605-4, 605-5, 605-6, 605-7, and 605-8. Note that if the entry after tail pointer 415/425 is head pointer 610, then queue 410/420 is full, and if tail pointer 415/425 and head pointer 610 both point to the same entry, then queue 410/420 is empty.

Turning back to FIG. 5, as noted above, SQE 405 may have a specific structure. This structure may be defined according to a specification. As an example, the current specification for Non-Volatile Memory Express (NVMe Specification 2.0c), which is incorporated by reference herein for all purposes, defines the structure of SQE 405 as shown in FIG. 5. According to this specification, SQE 405 may include a total of 64 bytes of data. At this time, only 33 bits are not currently used in one field or another for an SQE sending a write command to storage device 120. These bits are shown with cross-hatching in FIG. 5. Put another way, SQE 405 is currently approximately 93.5% in use. Other technical proposals are currently being considered, which may further reduce the number of bits unallocated. For example, the Key Per Input/Output (KPIO) technical proposal, if adopted, may use 16 bits that are not currently allocated. A write command may be identified by the write operation code (opcode) in SQE 405: other commands may have different opcodes. Other commands may have different structures, different sizes, and different numbers of bits that are not currently used.

While the size of SQE 405 could be increased beyond 64 bytes, changing the size of SQE 405 might involve changing how storage device 120 of FIG. 1 reads and processes SQEs, which might prevent backward compatibility with existing hardware. Thus, other techniques to support additional data delivery to storage device 120 of FIG. 1 are desired.

FIGS. 4 and 6 suggest that submission queue 410 (and completion queue 415 as well) may use a contiguous block of memory 115 of FIG. 1. But other embodiments of the disclosure may support queues 410 and/or 415 using noncontiguous blocks of memory. That is, a queue might use two or more different blocks of memory 115 of FIG. 1. In addition, each queue 410 and/or 415 may use different blocks of memory of different sizes, and may be independently located within memory 115 of FIG. 1. For example, one queue 410 or 415 might use a single contiguous block of memory 115 of FIG. 1, another queue 410 or 415 might use three noncontiguous blocks of memory, a third queue 410 or 415 might use 4 noncontiguous blocks of memory, and so on.

Figure 7:
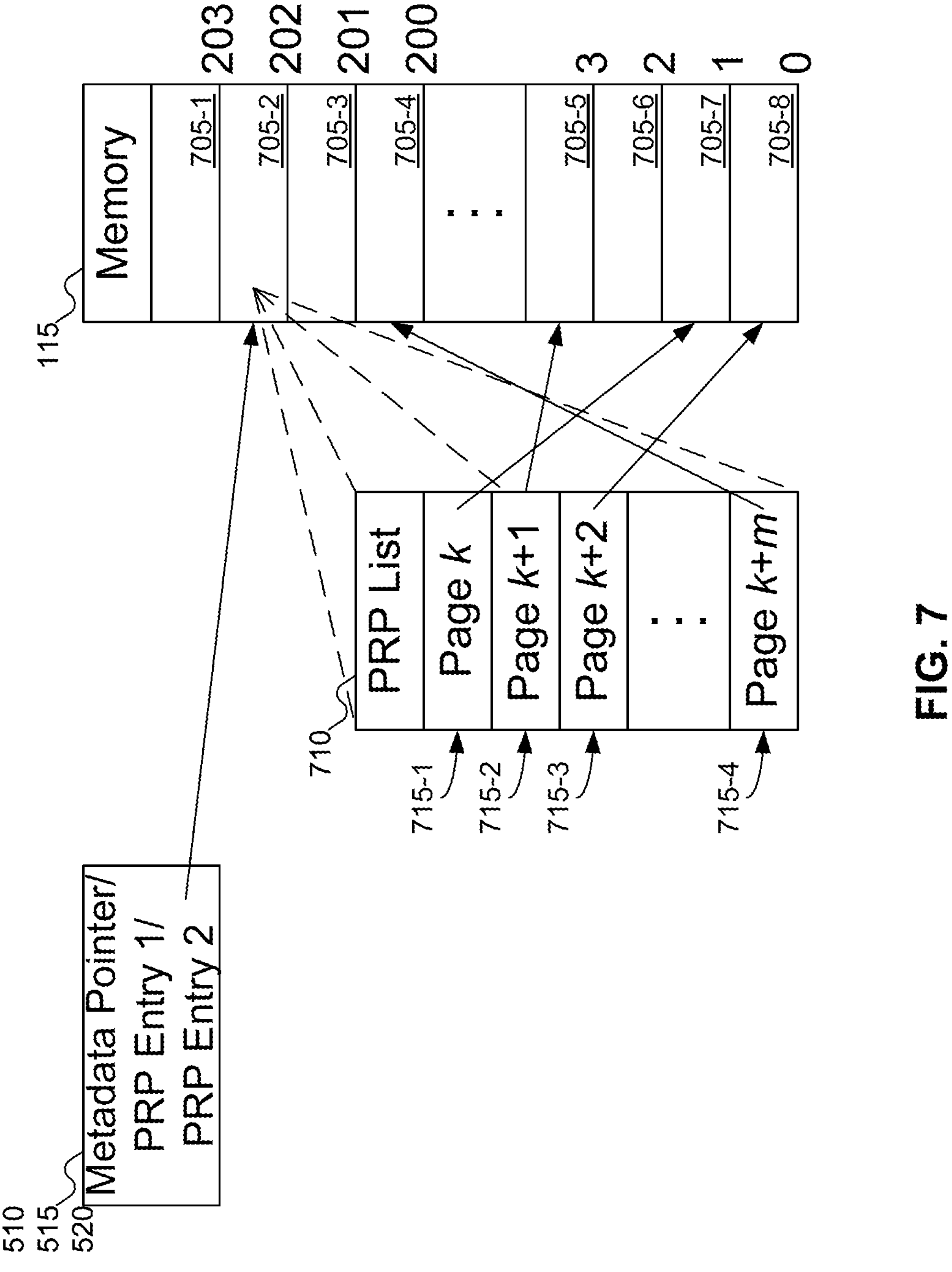
FIG. 7 shows details of a Physical Region Page (PRP) used for metadata and other data for the submission queue entry of FIG. 4, according to embodiments of the disclosure.
Figure 8:
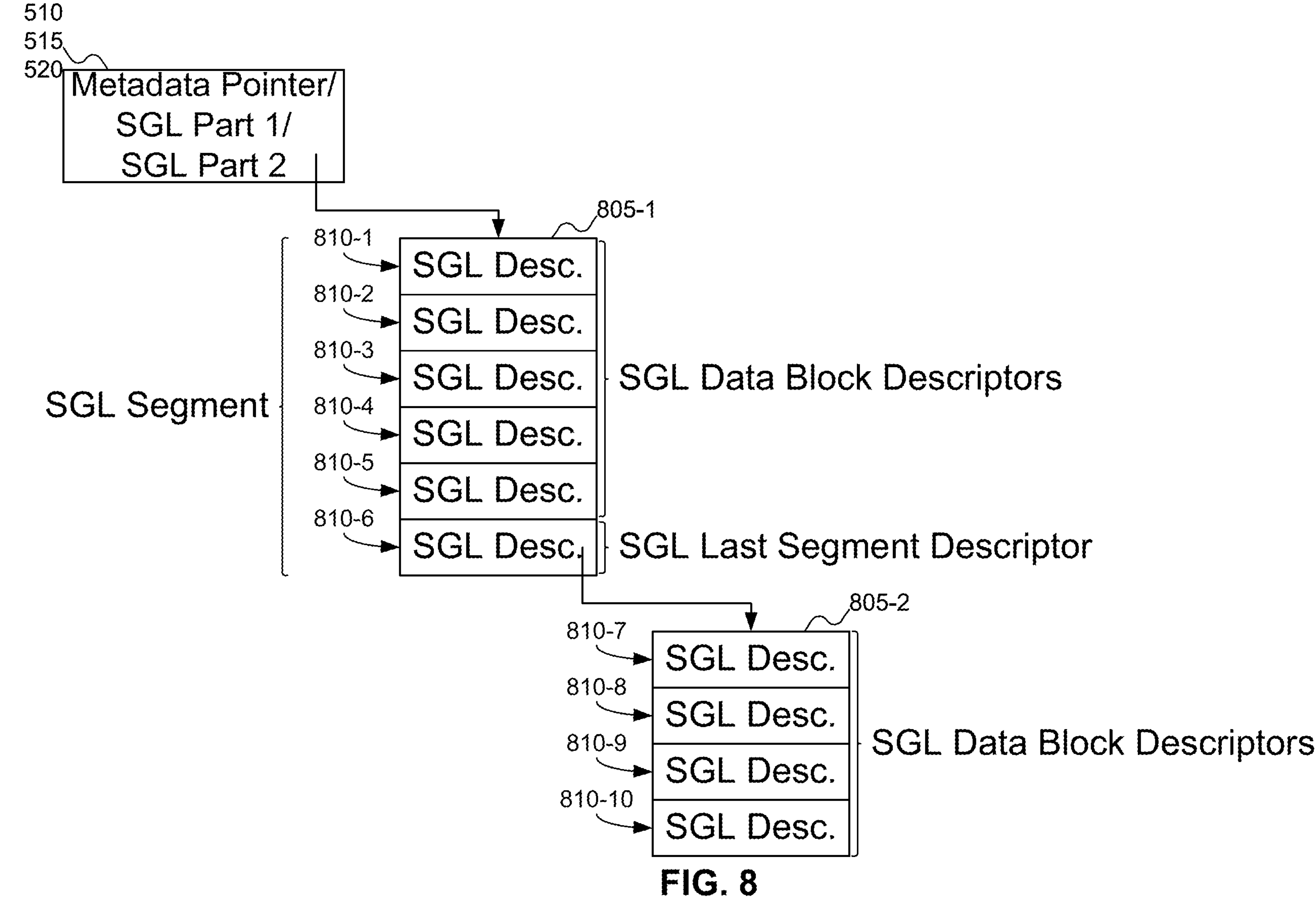
FIG. 8 shows details of a Scatter Gather List (SGL) used for metadata and other data for the submission queue entry of FIG. 4, according to embodiments of the disclosure.

Embodiments of the disclosure may attempt to address the space available in SQE 405 by using space pointed to by metadata pointer 510, PRP Entry 1/SGL Part 1 515, and/or PRP Entry 2/SGL Part 2 520. FIGS. 7-8 show ways in which the PRP/SGL may be modified to store additional data related to the command.

FIG. 7 shows details of a Physical Region Page (PRP) used for metadata and other data for submission queue entry 405 of FIG. 4, according to embodiments of the disclosure. For simplicity, the discussion below refers to "metadata pointer 510", which may be understood to mean any of metadata pointer 510, PRP Entry 1 515, or PRP Entry 2 520.

In FIG. 7, memory 115 may be divided into pages, such as pages 705-1 through 705-8 (which may be referred to collectively as pages 705 or memory pages 705), and which may be numbered from 0 to any upper bound: in FIG. 7 the upper bound is shown as memory page 203, but other upper bounds may also be used. Metadata pointer 510 may point to a page in memory 115. For example, in FIG. 7, metadata pointer 510 may point to page 705-2, which may store PRP list 710 (which may also be referred to as data structure 710). PRP list 710 may include a various entries 715-1 through 715-4 (which may be referred to collectively as entries 715 or pointers 715), which may point to pages in memory 115 where additional data is stored. For example, entries 715-1 through 715-4 may point to pages 705-7, 705-5, 705-0, and 705-4. While FIG. 7 shows PRP list 710 as including four entries 715, embodiments of the disclosure may include any number of entries 715 in PRP list 710.

In FIG. 7, PRP list 710 is shown as including pages k through k+m+1. The reason for this numbering is that PRP list 710 might be a continuation of a chain of PRP lists 710. That is, rather than having all pages included in a single PRP list 710, some pages may be stored in one PRP list 710, which may point to another PRP list 710, which may include other pages. That PRP list 710 might, in turn, point to yet another PRP list 710. So, the first entry in PRP list 710, including a pointer for page k, might not be the first page in the overall PRP list, but instead might be the $k^{-th}$ page in the PRP list. PRP list 710 itself may include pointers for m pages (accounting for pages k through k+m). The last page in PRP list 710, page k+m+1, may point to the next PRP list 710 in the chain. If PRP list 710 is actually the first PRP list 710 in the chain, then k may be 1, and thus PRP list 710 might include pointers for pages 1 through m (with page m+1 pointing to the next PRP list 710 in the chain). Note that for each PRP list 710 in the chain, the value of k may differ, to reflect that there have been earlier PRP lists 710 in the chain, each with their own pointers.

In some embodiments of the disclosure, entries 715 in PRP list 710 may be used to store data to be delivered to storage device 120 of FIG. 1. For example, for a write command, entries in PRP list 710 may point to the data to be written to storage device 120 of FIG. 1. Embodiments of the disclosure may expand on this functionality by using one or more of the entries in PRP list 710 to point to data related to the command, rather than to data to be written to storage device 120 of FIG. 1. That is, one or more of entries 715 may store, aside from user data to be written to storage device 120 of FIG. 1, data relating to the command but for which there are no fields in SQE 405 of FIG. 4. Thus, for example, entry 715-1 might point to memory page 705-7, which may store the data related to the command but that is not user data. Or, entry 715-4 might point to memory page 705-4, which may store the data related to the command but that is not user data.

While FIG. 7 shows metadata pointer 510 pointing to page 705-2 that includes PRP list 710, embodiments of the disclosure may have metadata pointer 510 storing the actual PRP list 710, or a pointer to PRP list 710, or a pointer to a pointer to PRP list 710. In addition, while FIG. 5 suggests that metadata pointer 510 and entries 715 all point to the boundaries of memory pages 705, embodiments of the disclosure may include offsets for one or more of memory pages 705. Put another way, PRP list 710, or any data identified by entries 715 of PRP list 710, might not start at the boundary of memory pages 705, but rather start at some offset from the boundaries of memory pages 705: these offsets may be included with the address of the page containing the data in question.

In some embodiments of the disclosure, any entry 715 in PRP list 710 may point to a memory page 705 that may store the data related to the command. As data is read from the memory pages 705 pointed to be entries 715 in PRP list 710, the data may be buffered: for example, in memory 340 of FIG. 3. But in some embodiments, the first or last entry 715 in PRP list 710 may point to the memory page 705 that stores the data related to the command. By using a particular entry 715 in PRP list 710, storage device 120 of FIG. 1 might be able to prioritize retrieving the data related to the command (which storage device 120 of FIG. 1 might need before storage device 120 of FIG. 1 may execute the command and process user data).

FIG. 8 shows details of a Scatter Gather List (SGL) used for metadata and other data for submission queue entry 405 of FIG. 4, according to embodiments of the disclosure. FIG. 8 is similar to FIG. 7, except that a different structure is used to deliver the data in question. As with FIG. 7, for simplicity, the discussion below refers to "metadata pointer 510", which may be understood to mean any of metadata pointer 510, SGL Part 1 515, or SGL Part 2 520.

An SGL is a structure that includes a list (the "List" of "Scatter Gather List"). The SGL includes one or more SGL segments, each of which may be stored in memory and may include one or more SGL descriptors (which is the basic unit of the SGL). The SGL descriptor may be a continuous memory space: that is, an SGL descriptor may be fully identified by a starting address and a space size.

There are various different types of SGL descriptors. Some of these descriptors include a data block, a segment descriptor, and a last segment descriptor. A data block may store user data. A segment descriptor may include a list of SGL segments, and may point to the next SGL segment in the SGL. The last segment descriptor is a special segment descriptor, which may represent the last segment in the SGL (and thus may not have a pointer to another SGL segment).

Thus, for example, metadata pointer 510 may be an SGL segment descriptor, pointing to SGL segment 805-1. SGL segment 805-1 may include various SGL data block descriptors, identified by pointers 810-1 through 810-5, and an SGL last segment descriptor 810-6, which may point to SGL segment 805-2. SGL segment 805-2 may be similar to SGL segment 805-1 and may include pointers 810-6 through 810-10, but without including a pointer to another SGL segment. (SGL segments 805-1 and 805-2 may be referred to collectively as SGL segments 805, segments 805, or data structures 805; pointers 810-1 through 810-10 may be referred to collectively as pointers 810 or SGL descriptors 810.)

Each SGL descriptor 810 may include a block of data that may depend on the type of SGL descriptor 810. Each SGL descriptor 810 may also include a descriptor type: this descriptor type may identify the type of data stored in SGL descriptor 810. Thus, an SGL data block descriptor may have a different descriptor type than an SGL segment descriptor, and the data stored in the SGL data block descriptor may be interpreted differently from the data in the SGL segment descriptor. Put another way, the structure of the data stored in an SGL descriptor (at least as it is expected to be interpreted by storage device 120 of FIG. 1) may vary depending on the descriptor type.

To support storing data relating to a command (rather than the data to be written to storage device 120 of FIG. 1), a new descriptor type may be defined. This new descriptor type may indicate that the data in the SGL descriptor stores data relating to a command, rather than user data (as with the SGL data block descriptor).

Aside from the structural differences between the PRP list 710 of FIG. 7 and the SGL of FIG. 8, data represented by PRP list 710 of FIG. 7 may be bounded by the boundaries of memory pages 705 of FIG. 7. Thus, regardless of where data might start in, for example, memory page 705-7 of FIG. 7, that data might end at the boundary between memory pages 705-7 and 705-6. SGLs, on the other hand, may cross the boundaries between memory pages 705 of FIG. 7.

As mentioned above, in either FIGS. 7-8, data relating to the command may be stored in multiple entries (be they entries 715 of FIG. 7 or SGL descriptors 810 of FIG. 8). In some embodiments of the disclosure, processor 110 of FIG. 1 and/or storage device 120 of FIG. 1 may leverage multiple entries by using one entry to specify a structure for the data relating to the command stored in the other entry. Thus, for example, one entry may specify how the data in the other entry may be interpreted.

For simplicity, the portion of memory used to store the data relating to the command, whether memory page 705 of FIG. 7 or SGL descriptor 810 of FIG. 8, may be referred to as a memory area or a data structure.

Figure 9:
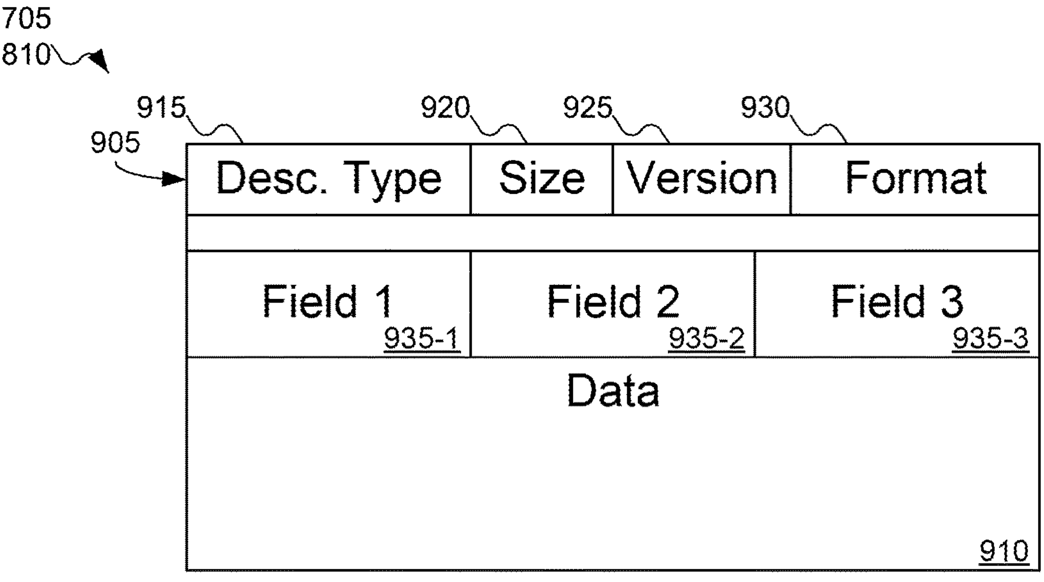
FIG. 9 shows details of an area of memory used for additional command data in the PRP list of FIG. 7 or the SGL of FIG. 8, according to embodiments of the disclosure.

FIG. 9 shows details of an area of memory used for additional command data in PRP list 710 of FIG. 7 or SGL 805 of FIG. 8, according to embodiments of the disclosure. In FIG. 9, memory page 705 or SGL descriptor 810 may include two portions 905 and 910. Portion 905 may function as a header, storing various pieces of information that may govern how portion 910 may be interpreted. For example, portion 905 may include descriptor type 915, size 920, version 925, and/or format 930. Descriptor type 915 may be, for example, a new SGL descriptor type to identify portion 910 as storing data relating to the command. Size 920 may be the size of the data stored in portion 910. Note that descriptor type 915 may also specify the size of the data: for example, one descriptor type might specify 16 bytes of data relating to the command, whereas another descriptor type might specify 64 bytes of data relating to the command. Version 925 might specify a particular version of the data structure used in portion 910, which might indicate what fields are supported in portion 910 or other information, such as the size of portion 910. Finally, format 930 might specify a particular format used for the data in portion 910: for example, that the data is stored in eXtensible Markup Language (XML) format or JavaScript Object Notation (JSON) format.

In addition, portion 910 may include various fields, such as fields 935-1, 935-2, and 935-3 (which may be referred to collectively as fields 935). Fields 935 may store specific data expected for the command in SQE 405 of FIG. 4. Note that not all fields are necessarily required. For example, processor 110 of FIG. 1 might provide data for fields 935-1 and 935-3, but not for field 935-2. Which fields 935 include data may depend on the command in SQE 405 of FIG. 4, and what additional data processor 110 of FIG. 1 wants to provide for that command.

Figure 10:
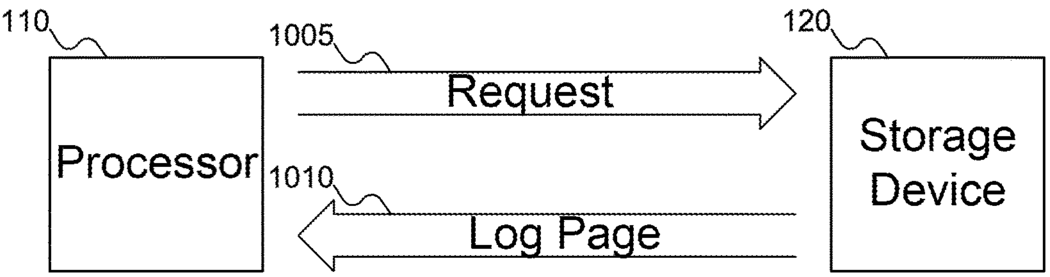
FIG. 10 shows the processor of FIG. 1 requesting and receiving a log page from the storage device of FIG. 1, for information about the structure of the area of memory of FIGS. 7-8, according to embodiments of the disclosure.

In some embodiments of the disclosure, storage device 120 of FIG. 1 may have expectations regarding what data is to be provided in memory page 715 of FIG. 7 or SGL descriptor 810 of FIG. 8. For example, storage device 120 of FIG. 1 might expect the data in a particular format, or might be configured to support only certain fields in portion 910 of FIG. 9. FIG. 10 shows how processor 110 of FIG. 1 may request this information from storage device 120 of FIG. 1.

FIG. 10 shows processor 110 of FIG. 1 requesting and receiving a log page from storage device 120 of FIG. 1, for information about the structure of the area of memory page 705 of FIG. 7 or SGL descriptor 810 of FIG. 8, according to embodiments of the disclosure. Processor 110 may send request 1005 to storage device 120, which may respond in turn with log page 1010. Log page 1010 may be a log page that includes information about the expected structure of memory page 705 of FIG. 7 or SGL descriptor 810 of FIG. 8. For example, log page 1010 may include information about size 920 of FIG. 9, version 925 of FIG. 9, format 930 of FIG. 9, or which fields 935 of FIG. 9 are supported by storage device 120. In this manner, processor 110 may establish memory page 705 of FIG. 7 or SGL descriptor 810 of FIG. 8 in a manner consistent with the expectations (and capabilities) of storage device 120.

While FIG. 10 shows storage device 120 sending a log page in response to request 1005, embodiments of the disclosure may also use other data structures or mechanisms to transfer information about the expected structure of memory page 705 of FIG. 7 or SGL descriptor 810 of FIG. 8. For example, the information may be conveyed in a message, in a vendor-specific data structure, via an NVMe Management Interface (NVMe-MI), or stored in a readable location in host 105 by storage device 120, such as a buffer, register, or a Vital Product Data in some form of Read-Only Memory (ROM), such as a Programmable Read-Only Memory (PROM), an Erasable Programmable Read-Only Memory (EPROM), or an Electrically Erasable Programmable Read-Only Memory (EEPROM).

Processor 110 may send request 1005 for the log page to storage device 120 at any time. In some embodiments of the disclosure, processor 110 may send request 1005 during the boot process for machine 105 of FIG. 1. For example, processor 110 may discover storage device 120, as well as other devices included in machine 105 of FIG. 1, during a boot process. Processor 110 may then query storage device 120 for its data structures. If storage device 120 reports additional capabilities, such as support for additional SQE data, then processor 110 may send log page request 1005. Log page 1010 may then include all information about the additional capabilities of storage device 120, including what options storage device 120 has for supporting additional SQE data. Processor 110 may then send a request to set data (such as a Set Log Page request) to inform storage device 120 regarding what options processor 110 will use. Processor 110 may then finish the boot process, including creating submission queues 410 of FIG. 4 and completion queues 420 of FIG. 4. In addition, or alternatively, processor 110 may use Get Log Page and/or Set Log Page requests after the boot process, to achieve similar results.

In some embodiments of the disclosure, processor 110 may provide a clue to storage device 120 that there is a memory area including additional data relating to the command. For example, a flag may be set in SQE 405 of FIG. 4, indicating that a memory area has been used to store data relating to the command. This flag may be, for example, a bit or bits in SQE 405 of FIG. 4 that storage device 120 might otherwise ignore or consider to be in error. In some embodiments of the disclosure, a currently unused bit, such as bit 10 of double word 0, might be set to 1 to indicate that a memory area includes additional data relating to the command. In other embodiments of the disclosure, the Fused field (bits 8 and 9 of double word 0) may be set to 11. Since the value 11 in the Fused field is not defined, its use would not interfere with other uses of the Fused field.

The above discussion describes embodiments of the disclosure to support additional data being used with a submission queue entry. Other embodiments of the disclosure may also be applicable to completion queue entries stored in completion queues, or in other queues containing entries of fixed size. Such embodiments of the disclosure may operate similarly to how submission queue entries may support additional data. All such embodiments are considered part of this disclosure.

Figure 11:
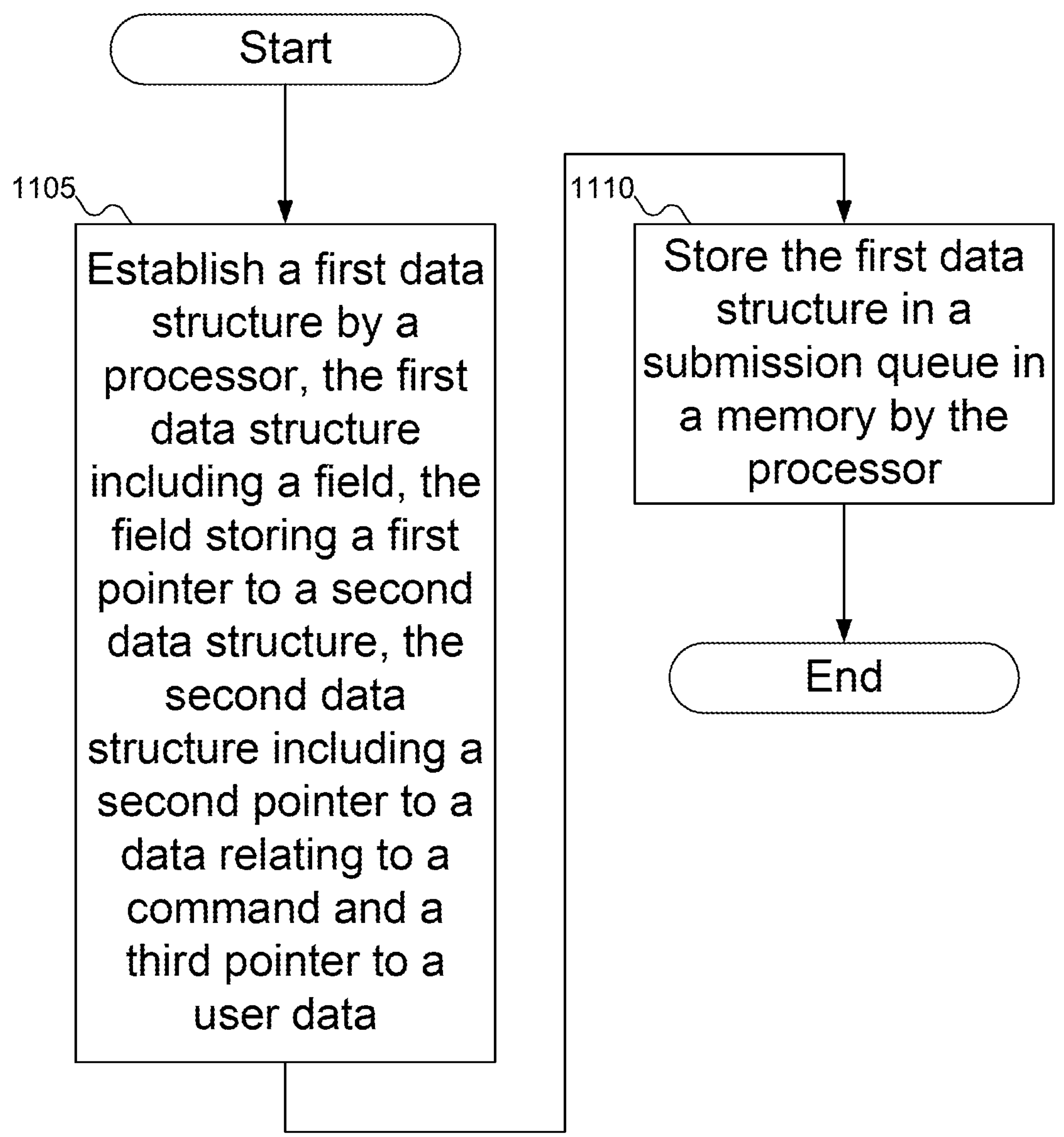
FIG. 11 shows a flowchart of an example procedure for the processor of FIG. 1 to establish the submission queue entry of FIG. 4 using the area of memory of FIGS. 7-8 for additional command data, according to embodiments of the disclosure.

FIG. 11 shows a flowchart of an example procedure for processor 110 of FIG. 1 to establish submission queue entry 405 of FIG. 1 using memory page 705 of FIG. 7 or SGL descriptor 815 of FIG. 8 for additional command data, according to embodiments of the disclosure. In FIG. 11, at block 1105, processor 110 of FIG. 1 may establish a data structure, such as SQE 405 of FIG. 4. This data structure may include a pointer, such as metadata pointer 510 of FIG. 5, PRP Entry 1/SGL Part 1 515 of FIG. 5, or PRP Entry 2/SGL Part 2 520 of FIG. 5, which may point to a second data structure, such as PRP list 710 of FIG. 7 or SGL segment 805 of FIG. 8. This second data structure may, in turn, include a pointer, such as entry 715 of FIG. 7 or SGL descriptor 810. Note that the second data structure, be it PRP list 710 of FIG. 7 or SGL segment 805 of FIG. 8, may include entries 715/SGL descriptors 810 that point to both data relating to the command but that was not included in SQE 405 of FIG. 4 (perhaps because the data could not fit, or for other reasons), and user data (such as data to be written to storage device 120 of FIG. 1). At block 1110, processor 110 of FIG. 1 may store SQE 405 of FIG. 4 in submission queue 410 of FIG. 4.

Figures 12, 13:
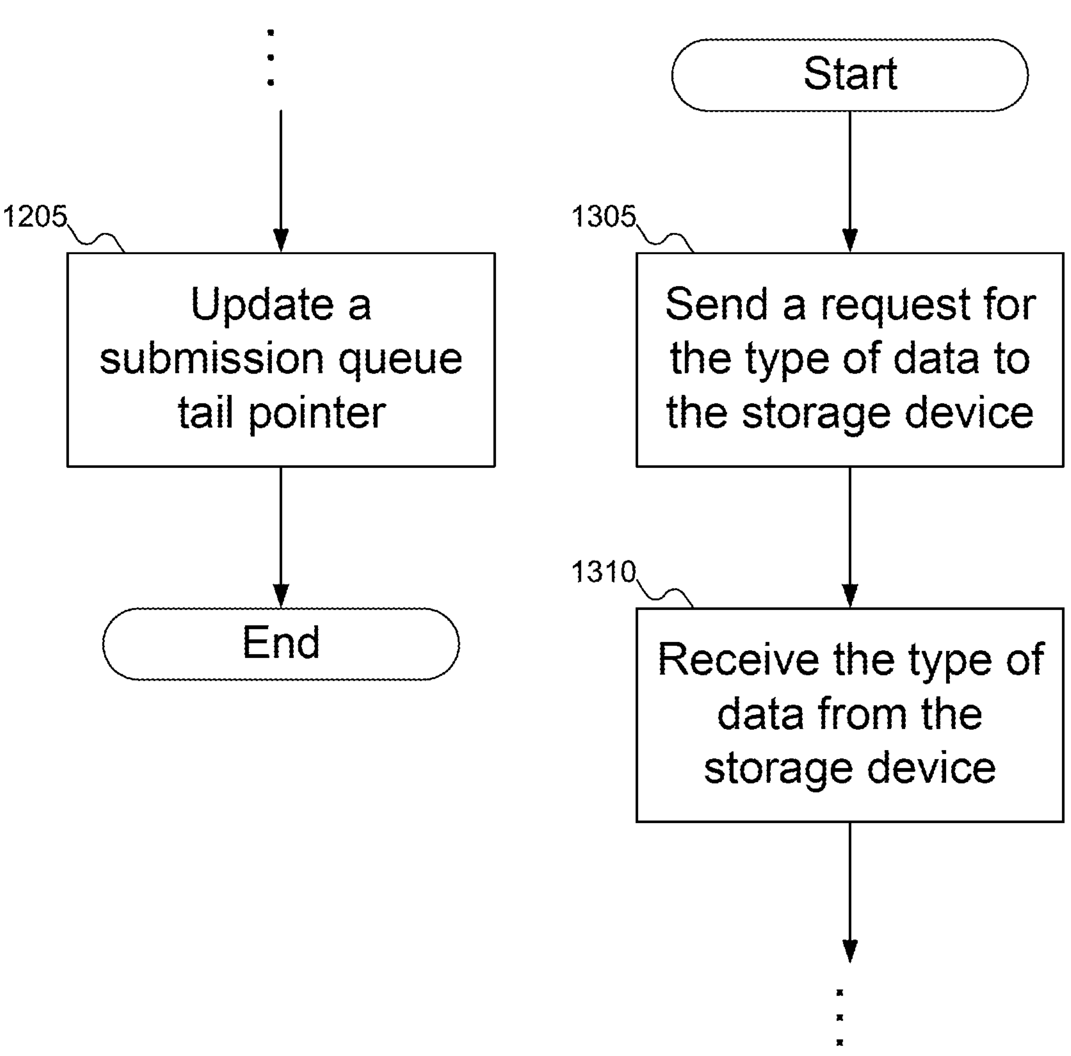
FIG. 12 shows a flowchart of an example procedure for the processor of FIG. 1 to inform the storage device of FIG. 1 that the submission queue entry of FIG. 4 is present in the submission queue of FIG. 4, according to embodiments of the disclosure.
FIG. 13 shows a flowchart of an example procedure for the processor of FIG. 1 to request and receive information about the structure of the memory page of FIGS. 7-8 expected by the storage device of FIG. 1, according to embodiments of the disclosure.

FIG. 12 shows a flowchart of an example procedure for processor 110 of FIG. 1 to inform storage device 120 of FIG. 1 that SQE 405 of FIG. 4 is present in the submission queue of FIG. 4, according to embodiments of the disclosure. In FIG. 12, at block 1205, processor 110 of FIG. 1 may update submission queue tail pointer 415 of FIG. 4, which may notify storage device 120 of FIG. 1 that SQE 405 of FIG. 4 has been added to submission queue 410 of FIG. 4. Alternatively, processor 110 of FIG. 1 may notify storage device 120 of FIG. 1 that SQE 405 of FIG. 4 has been added to submission queue 410 of FIG. 4 by ringing a doorbell (whether or not submission queue tail pointer 415 of FIG. 4 was updated).

FIG. 13 shows a flowchart of an example procedure for processor 110 of FIG. 1 to request and receive information about the structure of the memory area of FIGS. 7-8 expected by storage device 120 of FIG. 1, according to embodiments of the disclosure. In FIG. 13, at block 1305, processor 110 of FIG. 1 may send request 1005 of FIG. 10 to storage device 120 of FIG. 1. At block 1310, processor 110 of FIG. 1 may receive the type of data storage device 120 of FIG. 1 expects in portion 910 of FIG. 9 of the memory area. This information may be returned as log page 1010 of FIG. 10, or may be returned using some alternative mechanism to transmit such information from storage device 120 of FIG. 1.

In FIGS. 11-13, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may enhance metadata associated with a submission queue entry (SQE). The enhanced metadata may support storing additional data to be used with a command in the SQE but not included in the SQE, for whatever reason. Embodiments of the disclosure offer a technical advantage by allowing for more data to be included with a command than might normally be stored in an SQE without having to modify the specification to make the SQE larger (which might prevent backward compatibility with storage devices that do not know how to process the additional data relating to the command).

Systems, methods, and apparatus in accordance with example embodiments of the disclosure may involve hosts, solid state storage devices (SSD), and SSD controllers which use one or more methods of managing Submission Queue Entries (SQE). Embodiments of the disclosure may enable continued expansion of Nonvolatile Memory Express (NVMe) SQEs while not expanding the use of 64 byte SQEs.

In some embodiments of the disclosure, the methods and apparatuses may follow some or all of the following actions:

1. The host may write SQ Entry into a memory location, for example, DRAM.
2. The host may write the SQ Tail Doorbell update to the device.
3. The device may read the SQ Entry.
4. The command may execute.
5. The device may write the Completion Queue (CQ) Entry.
6. The device controller may generate one or more Interrupts and send them to the host.
7. The host may read the CQ Entry.
8. The host may write the CQ Head Doorbell (DB) update to the device.

SQEs in their present state, are running low or out of space. Overflowing of the 64 bytes in the SQE may cause many issues in compatibility, speed and processing capabilities of current and future systems.

Embodiments of the disclosure may repurpose bits that are not presently assigned a purpose for communicating information about the write command. Embodiments of the disclosure exemplary of the write command should not be deemed limiting and one in the art would appreciate that any type of SQE would be applicable and conceptualized (for example, write commands, flush, compare, verify, copy, reservation register, etc.). For example, in the NVMe specification 2.0c, 33 bits are not currently in use. Some commands may have more bits available.

The "I/O Submission Queue Entry Size" field in "Controller Configuration" (CC.IOSQES) and SQES field in Identify Controller enable powers of two increases. Therefore, hosts and SSDs both use hardware accelerations around 64 bytes.

Reassignment of unused bits, or double usage of bits, extends the usefulness of 64 byte SQEs by expanding backwards compatibility, saving system resources, and increasing efficiency in future systems. In one example, bit 10 may be used to indicate a normal write command that uses a second definition of Write SQE where the LB ST, LBAT, and LBATM fields all contain a secondary meaning.

Any of the storage devices disclosed herein may communicate through any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), User Datagram Protocol (UDP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, Hypertext Transfer Protocol (HTTP), and/or the like, or any combination thereof.

Any of the functionality disclosed herein may be implemented with hardware, software, or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In the embodiments of the disclosure described herein, the operations are example operations, and may involve various additional operations not explicitly illustrated. In some embodiments of the disclosure, some of the illustrated operations may be omitted. In some embodiments of the disclosure, one or more of the operations may be performed by components other than those illustrated herein. Additionally, in some embodiments of the disclosure, the temporal order of the operations may be varied. Moreover, the figures are not necessarily drawn to scale.

Table of Acronyms

| | |
|---|---|
| PRP | Physical Region Page |
| STC | Self-test Code |
| SGL | Scatter Gather List |
| FUA | Force Unit Access |
| LBST | Logical Block Storage Tag |
| DSM | Dataset Management |
| ILBRT | Initial Logical Block Reference Tag |
| DSPEC | Directive Specific |
| LBA | Logical Block Address |
| LBAT | Logical Block Application Tag |
| LBATM | Logical Block Application Tag Mask |
| LR | Limited Retry |

The metadata, PRP Entry 1 or SGL part 1, and PRP Entry 2 or SGL part 2 fields may follow a pointer for extended parsing. The parsing may be for additional data and metadata.

In some embodiments of the disclosure, the metadata structure may be altered. For example, the first or Last PRP/SGL entry may be additional SQE information rather than data locations. In another example, an SGL Code 4h descriptor type may be defined for extended SQE information.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a memory, comprising:

- a first data structure stored in the memory, the first data structure including a field, the field to store a first pointer to a second data structure, the second data structure including a second pointer to a data relating to a command and a third pointer to a user data; and
- a queue stored in the memory, the queue including the first data structure.

Statement 2. An embodiment of the disclosure includes the memory according to statement 1, wherein the queue includes a submission queue or a completion queue.

Statement 3. An embodiment of the disclosure includes the memory according to statement 1, wherein the field includes a Physical Region Page (PRP) list.

Statement 4. An embodiment of the disclosure includes the memory according to statement 1, wherein the field includes a Scatter Gather List (SGL).

Statement 5. An embodiment of the disclosure includes the memory according to statement 4, wherein the field includes a descriptor type.

Statement 6. An embodiment of the disclosure includes the memory according to statement 5, wherein the descriptor type identifies the data relating to the command.

Statement 7. An embodiment of the disclosure includes the memory according to statement 5, wherein the descriptor type identifies a format for the data relating to the command.

Statement 8. An embodiment of the disclosure includes the memory according to statement 5, wherein the descriptor type identifies a size of the data relating to the command.

Statement 9. An embodiment of the disclosure includes the memory according to statement 5, wherein the descriptor type includes a version number.

Statement 10. An embodiment of the disclosure includes the memory according to statement 1, wherein:

- the data relating to the command includes a first portion of the data relating to the command and a second portion of the data relating to the command; and
- the first portion of the data relating to the command describes a structure for the second portion of the data relating to the command.

Statement 11. An embodiment of the disclosure includes the memory according to statement 10, wherein the second portion of the data uses an eXtensible Markup Language (XML) format or a JavaScript Object Notation (JSON) format.

Statement 12. An embodiment of the disclosure includes the memory according to statement 1, wherein the data relating to the command may be stored in a page in the memory.

Statement 13. An embodiment of the disclosure includes the memory according to statement 12, wherein the data relating to the command may include a fourth pointer to a second page in the memory, the second page including a second data relating to the command.

Statement 14. An embodiment of the disclosure includes the memory according to statement 1, wherein the second pointer follows the third pointer in the second data structure.

Statement 15. An embodiment of the disclosure includes the memory according to statement 1, wherein the third pointer follows the second pointer in the second data structure.

Statement 16. An embodiment of the disclosure includes the memory according to statement 1, wherein a storage device is configured to prioritize the data relating to the command over the user data.

Statement 17. An embodiment of the disclosure includes the memory according to statement 1, wherein the second data structure further includes a fourth pointer to a second user data.

Statement 18. An embodiment of the disclosure includes the memory according to statement 1, wherein a type of the data relating to the command is determined by a storage device.

Statement 19. An embodiment of the disclosure includes the memory according to statement 18, wherein the data relating to the command includes a second field.

Statement 20. An embodiment of the disclosure includes the memory according to statement 19, wherein the storage device is configured to support the second field and a third field.

Statement 21. An embodiment of the disclosure includes the memory according to statement 18, wherein the storage device is configured to identify the type of the data relating to the command supported by the storage device based at least in part on a request from a host.

Statement 22. An embodiment of the disclosure includes the memory according to statement 21, wherein the request includes a log page request.

Statement 23. An embodiment of the disclosure includes the memory according to statement 1, wherein the first data structure further includes a second field to store a value indicating the existence of the data relating to the command.

Statement 24. An embodiment of the disclosure includes the memory according to statement 23, wherein the second field includes bits 8 and 9 of double word 0.

Statement 25. An embodiment of the disclosure includes the memory according to statement 24, wherein the value includes 11.

Statement 26. An embodiment of the disclosure includes a system, comprising:

- a processor;
- a storage device, the storage device connected to the processor; and
- a memory, the memory connected to the processor and the storage device, the memory including:
- a first data structure stored in the memory, the first data structure including a field, the field to store a first pointer to a second data structure, the second data structure including a second pointer to a data relating to a command and a third pointer to a user data; and a queue stored in the memory, the queue including the first data structure.

Statement 27. An embodiment of the disclosure includes the system according to statement 26, wherein the queue includes a submission queue or a completion queue.

Statement 28. An embodiment of the disclosure includes the system according to statement 26, wherein the field includes a Physical Region Page (PRP) list.

Statement 29. An embodiment of the disclosure includes the system according to statement 26, wherein the field includes a Scatter Gather List (SGL).

Statement 30. An embodiment of the disclosure includes the system according to statement 29, wherein the field includes a descriptor type.

Statement 31. An embodiment of the disclosure includes the system according to statement 30, wherein the descriptor type identifies the data relating to the command.

Statement 32. An embodiment of the disclosure includes the system according to statement 30, wherein the descriptor type identifies a format for the data relating to the command.

Statement 33. An embodiment of the disclosure includes the system according to statement 30, wherein the descriptor type identifies a size of the data relating to the command.

Statement 34. An embodiment of the disclosure includes the system according to statement 26, wherein:

the data relating to the command includes a first portion of the data relating to the command and a second portion of the data relating to the command; and the first portion of the data relating to the command describes a structure for the second portion of the data relating to the command.

Statement 35. An embodiment of the disclosure includes the system according to statement 34, wherein the first portion of the data includes a version number.

Statement 36. An embodiment of the disclosure includes the system according to statement 34, wherein the second portion of the data uses an eXtensible Markup Language (XML) format or a JavaScript Object Notation (JSON) format.

Statement 37. An embodiment of the disclosure includes the system according to statement 26, wherein the data relating to the command may be stored in a page in the memory.

Statement 38. An embodiment of the disclosure includes the system according to statement 37, wherein the data relating to the command may include a fourth pointer to a second page in the memory, the second page including a second data relating to the command.

Statement 39. An embodiment of the disclosure includes the system according to statement 26, wherein the second pointer follows the third pointer in the second data structure.

Statement 40. An embodiment of the disclosure includes the system according to statement 26, wherein the third pointer follows the second pointer in the second data structure.

Statement 41. An embodiment of the disclosure includes the system according to statement 26, wherein the storage device is configured to prioritize the data relating to the command over the user data.

Statement 42. An embodiment of the disclosure includes the system according to statement 26, wherein the second data structure further includes a fourth pointer to a second user data.

Statement 43. An embodiment of the disclosure includes the system according to statement 26, wherein a type of the data relating to the command is determined by the storage device.

Statement 44. An embodiment of the disclosure includes the system according to statement 43, wherein the data relating to the command includes a second field.

Statement 45. An embodiment of the disclosure includes the system according to statement 44, wherein the storage device is configured to support the second field and a third field.

Statement 46. An embodiment of the disclosure includes the system according to statement 43, wherein the storage device is configured to identify the type of the data relating to the command supported by the storage device based at least in part on a request from a host.

Statement 47. An embodiment of the disclosure includes the system according to statement 46, wherein the request includes a log page request.

Statement 48. An embodiment of the disclosure includes the system according to statement 26, wherein the first data structure further includes a second field to store a value indicating the existence of the data relating to the command.

Statement 49. An embodiment of the disclosure includes the system according to statement 48, wherein the second field includes bits 8 and 9 of double word 0.

Statement 50. An embodiment of the disclosure includes the system according to statement 49, wherein the value includes 11.

Statement 51. An embodiment of the disclosure includes a method, comprising:

establishing a first data structure by a processor, the first data structure including a field, the field storing a first pointer to a second data structure, the second data structure including a second pointer to a data relating to a command and a third pointer to a user data; and storing the first data structure in a queue in a memory by the processor.

Statement 52. An embodiment of the disclosure includes the method according to statement 51, wherein the queue includes a submission queue or a completion queue.

Statement 53. An embodiment of the disclosure includes the method according to statement 51, further comprising updating a queue tail pointer for the queue in a storage controller of a storage device.

Statement 54. An embodiment of the disclosure includes the method according to statement 51, wherein the field includes a Physical Region Page (PRP) list.

Statement 55. An embodiment of the disclosure includes the method according to statement 51, wherein the field includes a Scatter Gather List (SGL).

Statement 56. An embodiment of the disclosure includes the method according to statement 55, wherein the field includes a descriptor type.

Statement 57. An embodiment of the disclosure includes the method according to statement 56, wherein the descriptor type identifies the data relating to the command.

Statement 58. An embodiment of the disclosure includes the method according to statement 56, wherein the descriptor type identifies a format for the data relating to the command.

Statement 59. An embodiment of the disclosure includes the method according to statement 56, wherein the descriptor type identifies a size of the data relating to the command.

Statement 60. An embodiment of the disclosure includes the method according to statement 51, wherein:

the data relating to the command includes a first portion of the data relating to the command and a second portion of the data relating to the command; and the first portion of the data relating to the command describes a structure for the second portion of the data relating to the command.

Statement 61. An embodiment of the disclosure includes the method according to statement 60, wherein the first portion of the data includes a version number.

Statement 62. An embodiment of the disclosure includes the method according to statement 60, wherein the second portion of the data uses an eXtensible Markup Language (XML) format or a JavaScript Object Notation (JSON) format.

Statement 63. An embodiment of the disclosure includes the method according to statement 51, wherein the data relating to the command may be stored in a page in the memory.

Statement 64. An embodiment of the disclosure includes the method according to statement 63, wherein the data relating to the command may include a fourth pointer to a second page in the memory, the second page including a second data relating to the command.

Statement 65. An embodiment of the disclosure includes the method according to statement 51, wherein the second pointer follows the third pointer in the second data structure.

Statement 66. An embodiment of the disclosure includes the method according to statement 51, wherein the third pointer follows the second pointer in the second data structure.

Statement 67. An embodiment of the disclosure includes the method according to statement 51, wherein a storage device is configured to prioritize the data relating to the command over the user data.

Statement 68. An embodiment of the disclosure includes the method according to statement 51, wherein the second data structure further includes a fourth pointer to a second user data.

Statement 69. An embodiment of the disclosure includes the method according to statement 51, further comprising receiving a type of the data relating to the command from a storage device.

Statement 70. An embodiment of the disclosure includes the method according to statement 69, wherein the data relating to the command includes a second field.

Statement 71. An embodiment of the disclosure includes the method according to statement 70, wherein the storage device is configured to support the second field and a third field.

Statement 72. An embodiment of the disclosure includes the method according to statement 69, wherein receiving the type of the data relating to the command from the storage device includes sending a request for the type of the data relating to the storage command to the storage device from a host.

Statement 73. An embodiment of the disclosure includes the method according to statement 72, wherein sending the request for the type of the data relating to the storage command to the storage device from the host includes sending a log page request for the type of the data relating to the storage command to the storage device from the host.

Statement 74. An embodiment of the disclosure includes the method according to statement 51, wherein the first data structure further includes a second field to store a value indicating the existence of the data relating to the command.

Statement 75. An embodiment of the disclosure includes the method according to statement 74, wherein the second field includes bits 8 and 9 of double word 0.

Statement 76. An embodiment of the disclosure includes the method according to statement 75, wherein the value includes 11.

Statement 77. An embodiment of the disclosure includes an article, comprising a non-transitory storage medium, the non-transitory storage medium having stored thereon instructions that, when executed by a machine, result in:

establishing a first data structure by a processor, the first data structure including a field, the field storing a first pointer to a second data structure, the second data structure including a second pointer to a data relating to a command and a third pointer to a user data; and storing the first data structure in a queue in a memory by the processor.

Statement 78. An embodiment of the disclosure includes the article according to statement 77, wherein the queue includes a submission queue or a completion queue.

Statement 79. An embodiment of the disclosure includes the article according to statement 77, the non-transitory storage medium having stored thereon further instructions that, when executed by the machine, result in updating a queue tail pointer for the queue in a storage controller of a storage device.

Statement 80. An embodiment of the disclosure includes the article according to statement 77, wherein the field includes a Physical Region Page (PRP) list.

Statement 81. An embodiment of the disclosure includes the article according to statement 77, wherein the field includes a Scatter Gather List (SGL).

Statement 82. An embodiment of the disclosure includes the article according to statement 81, wherein the field includes a descriptor type.

Statement 83. An embodiment of the disclosure includes the article according to statement 82, wherein the descriptor type identifies the data relating to the command.

Statement 84. An embodiment of the disclosure includes the article according to statement 82, wherein the descriptor type identifies a format for the data relating to the command.

Statement 85. An embodiment of the disclosure includes the article according to statement 82, wherein the descriptor type identifies a size of the data relating to the command.

Statement 86. An embodiment of the disclosure includes the article according to statement 77, wherein:

the data relating to the command includes a first portion of the data relating to the command and a second portion of the data relating to the command; and the first portion of the data relating to the command describes a structure for the second portion of the data relating to the command.

Statement 87. An embodiment of the disclosure includes the article according to statement 86, wherein the first portion of the data includes a version number.

Statement 88. An embodiment of the disclosure includes the article according to statement 86, wherein the second portion of the data uses an eXtensible Markup Language (XML) format or a JavaScript Object Notation (JSON) format.

Statement 89. An embodiment of the disclosure includes the article according to statement 77, wherein the data relating to the command may be stored in a page in the memory.

Statement 90. An embodiment of the disclosure includes the article according to statement 89, wherein the data relating to the command may include a fourth pointer to a second page in the memory, the second page including a second data relating to the command.

Statement 91. An embodiment of the disclosure includes the article according to statement 77, wherein the second pointer follows the third pointer in the second data structure.

Statement 92. An embodiment of the disclosure includes the article according to statement 77, wherein the third pointer follows the second pointer in the second data structure.

Statement 93. An embodiment of the disclosure includes the article according to statement 77, wherein a storage device is configured to prioritize the data relating to the command over the user data.

Statement 94. An embodiment of the disclosure includes the article according to statement 77, wherein the second data structure further includes a fourth pointer to a second user data.

Statement 95. An embodiment of the disclosure includes the article according to statement 77, the non-transitory storage medium having stored thereon further instructions that, when executed by the machine, result in receiving a type of the data relating to the command from a storage device.

Statement 96. An embodiment of the disclosure includes the article according to statement 95, wherein the data relating to the command includes a second field.

Statement 97. An embodiment of the disclosure includes the article according to statement 96, wherein the storage device is configured to support the second field and a third field.

Statement 98. An embodiment of the disclosure includes the article according to statement 95, wherein receiving the type of the data relating to the command from the storage device includes sending a request for the type of the data relating to the storage command to the storage device from a host.

Statement 99. An embodiment of the disclosure includes the article according to statement 98, wherein sending the request for the type of the data relating to the storage command to the storage device from the host includes sending a log page request for the type of the data relating to the storage command to the storage device from the host.

Statement 100. An embodiment of the disclosure includes the article according to statement 77, wherein the first data structure further includes a second field to store a value indicating the existence of the data relating to the command.

Statement 101. An embodiment of the disclosure includes the article according to statement 100, wherein the second field includes bits 8 and 9 of double word 0.

Statement 102. An embodiment of the disclosure includes the article according to statement 101, wherein the value includes 11.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory, comprising:

a first data structure stored in the memory, the first data structure including a field, the field to store a first pointer to a second data structure, the second data structure including a second pointer and a third pointer, the second pointer pointing to a command parameter and an indication of a format of the command parameter, and the third pointer pointing to a user data; and a queue stored in the memory, the queue including the first data structure, wherein the command parameter instructs a storage device how to process the user data, and wherein a type of the command parameter is determined by the storage device and returned to a host.

2. The memory according to claim 1, wherein the field includes a Physical Region Page (PRP) list or a Scatter Gather List (SGL).

3. The memory according to claim 2, wherein the field includes a descriptor type.

4. The memory according to claim 3, wherein the descriptor type identifies the command parameter or a version number.

5. The memory according to claim 3, wherein:

the command parameter includes a first portion of the command parameter and a second portion of the command parameter; and the first portion of the command parameter describes a structure for the second portion of the command parameter.

6. The memory according to claim 1, wherein the type of the command parameter is determined by the storage device and returned to the host in a log page.

7. The memory according to claim 6, wherein the storage device is configured to identify the type of the command parameter supported by the storage device based at least in part on a request from the host.

8. The memory according to claim 1, wherein the first data structure further includes a second field to store a value indicating the command parameter exists.

9. A system, comprising:

a processor;

a storage device, the storage device connected to the processor; and a memory, the memory connected to the processor and the storage device, the memory including:

a first data structure stored in the memory, the first data structure including a field, the field to store a first pointer to a second data structure, the second data structure including a second pointer and a third pointer, the second pointer pointing to a command parameter and an indication of a format of the command parameter, and the third pointer pointing to a user data; and a queue stored in the memory, the queue including the first data structure, wherein the command parameter instructs the storage device how to process the user data, and wherein a type of the command parameter is determined by the storage device and returned to a host.

10. The system according to claim 9, wherein the field includes a Physical Region Page (PRP) list or a Scatter Gather List (SGL).

11. The system according to claim 10, wherein the field includes a descriptor type.

12. The system according to claim 11, wherein the descriptor type identifies the command parameter or a version number.

13. The system according to claim 11, wherein:

the command parameter includes a first portion of the command parameter and a second portion of the command parameter; and the first portion of the command parameter describes a structure for the second portion of the command parameter.

14. The system according to claim 9, wherein a type of the command parameter is determined by the storage device and returned to the processor in a log page.

15. The system according to claim 14, wherein the storage device is configured to identify the type of the command parameter supported by the storage device based at least in part on a request from the host.

16. The system according to claim 9, wherein the first data structure further includes a second field to store a value indicating the command parameter exists.

17. A method, comprising:

establishing a first data structure by a processor, the first data structure including a field, the field storing a first pointer to a second data structure, the second data structure including a second pointer and a third pointer, the second pointer pointing to a command parameter and an indication of a format of the command parameter, and the third pointer pointing to a user data; and storing the first data structure in a queue in a memory by the processor, wherein the command parameter instructs a storage device how to process the user data, and wherein a type of the command parameter is determined by the storage device and returned to a host.

18. The method according to claim 17, further comprising updating a queue tail pointer for the queue in a storage controller of the storage device.

19. The method according to claim 17, further comprising receiving a type of the command parameter from the storage device.

20. The method according to claim 19, wherein receiving the type of the command parameter from the storage device includes sending a request for the type of the command parameter to the storage device from the host.

* * * * *